US006807232B2

(12) United States Patent
Nicholson et al.

(10) Patent No.: US 6,807,232 B2
(45) Date of Patent: Oct. 19, 2004

(54) SYSTEM AND METHOD FOR MULTIPLEXING SYNCHRONOUS DIGITAL DATA STREAMS

(75) Inventors: James Nicholson, Austin, TX (US); Charles Schroeder, Round Rock, TX (US); Brian Johnson, Carthage, TX (US)

(73) Assignee: National Instruments Corporation, Austin, TX (US)

( * ) Notice: Subject to any disclaimer, the term of this patent is extended or adjusted under 35 U.S.C. 154(b) by 845 days.

(21) Appl. No.: 09/746,861

(22) Filed: Dec. 21, 2000

(65) Prior Publication Data

US 2002/0080809 A1 Jun. 27, 2002

(51) Int. Cl.[7] .................................................. H04N 7/12
(52) U.S. Cl. .............................. 375/240.26; 375/240.28
(58) Field of Search ....................... 375/240.26, 240.28; 370/98; 725/38, 91, 93, 114, 116, 117, 138, 144, 146, 147; 348/153, 159, 385.1, 387.1, 423.1, 584, 588, 598

(56) References Cited

U.S. PATENT DOCUMENTS

| | | | | | |
|---|---|---|---|---|---|
| 4,326,219 | A | * | 4/1982 | Griesshaber | ............... 348/251 |
| 4,387,370 | A | * | 6/1983 | Katagi | .......................... 345/12 |
| 4,943,854 | A | * | 7/1990 | Shiota et al. | ............... 348/159 |
| 5,268,932 | A | * | 12/1993 | Okuzono | .................... 375/354 |
| 5,414,447 | A | * | 5/1995 | Izzi et al. | .................... 345/530 |
| 5,526,050 | A | | 6/1996 | King et al. | |
| 6,020,931 | A | * | 2/2000 | Bilbrey et al. | ............... 348/584 |
| 6,201,580 | B1 | | 3/2001 | Voltz et al. | |

* cited by examiner

Primary Examiner—Chris Kelley
Assistant Examiner—George A Bugg, Jr.
(74) Attorney, Agent, or Firm—Meyertons Hood Kivlin Kowert & Goetzel, P.C.; Jeffrey C. Hood; Mark S. Williams

(57) ABSTRACT

A system and method for multiplexing synchronous parallel digital data streams with different clock frequencies into a single data stream while preserving each data stream's timing integrity. A plurality of digital data inputs and corresponding clock inputs are coupled to corresponding FIFOs (First In First Out buffers), which are coupled to a data multiplexer (MUX). Each clock input is coupled to a clock MUX which couples to each FIFO and the data MUX. Finally, a transition state machine is coupled to the clock MUX, the data MUX, and the FIFOs. Each digital data input receives a data stream from a source, such as a digital video camera, while the corresponding clock input concurrently receives a corresponding clock signal. The transition state machine controls the selection of a data stream from the MUXed data streams and the selection of the corresponding clock signal from the MUXed clock signals. The transition state machine may receive a selection signal from an external source and transmit the selection signal to the data MUX and the clock MUX, as well as the FIFOs. Each clock input transmits its clock signal to the clock MUX which selects a clock signal based on the selection signal, and transmits the selected clock signal to the data MUX, the FIFOs, and the transition state machine. Each FIFO transmits its digital data stream to the data MUX which selects the data streams corresponding to the selected clock signal and outputs the selected stream, such as to an image acquisition device.

26 Claims, 6 Drawing Sheets

SYSTEM AND METHOD FOR MULTIPLEXING SYNCHRONOUS DIGITAL DATA STREAMS

BACKGROUND OF THE INVENTION

1. Field of the Invention

The present invention generally relates to multiplexing synchronous digital data streams, such as video streams. In particular, the present invention relates to the multiplexing of multiple digital data streams while minimizing redundant hardware.

2. Description of the Related Art

In the design of digital camera based systems such as machine vision systems or image acquisition systems, a frequent design task involves accepting data from multiple cameras. The standard methodology for accomplishing this task involves the use of multiple image acquisition devices or frame grabbers. The selection between the images obtained from each camera is typically handled following the acquisition of the images. In other words, each camera has a corresponding image acquisition device. This redundancy in hardware may be quite expensive.

Two prior art approaches to this problem are described as follows.

FIG. 1: FIFO Decoupling System

FIG. 1 illustrates one prior art approach to the above problem, in which a video data stream 104 from each camera is fed into a corresponding FIFO (First In, First Out buffer) 102, then transmitted from the FIFO 102 to a video stream multiplexer (MUX) 110 which selects the video stream to be viewed. Because the video stream data are synchronous, each stream has a corresponding clock signal 106 with a characteristic frequency. Each FIFO 102 receives the input video data at the frequency of the corresponding clock 106, referred to as that FIFO's write frequency. An output clock signal is selected from one of the camera clocks and is used to synchronize reads from each of the FIFOs. Although this approach works for a selected FIFO which happens to correspond to the clock signal used as the output clock signal, the use of the output clock signal to synchronize reads from one of the other FIFOs may be problematic. For example, if the other FIFO's write frequency differs from the output clock signal frequency, then FIFO underflow or overflow may occur, as the data will be read faster or slower than the data are written to the FIFO, i.e., the data flow out of the FIFO will be greater or less than the data flow into the FIFO.

FIG. 2: Multiplexed Clock System

FIG. 2 illustrates a second prior art approach to the redundancy problem mentioned above. As FIG. 2 shows, video stream data 104 from each camera is fed to a video stream multiplexer (MUX) 110 which selects the desired video stream and transmits the video stream data to the user. As above, each synchronous video data stream has a corresponding clock signal 106 which is used to synchronize that data stream. Each of the clock signals from the cameras is fed into a clock multiplexer 112 which selects the clock signal corresponding to the selected video stream and transmits the clock signal 106 to the user. However, routing the clock signal 106 through the clock multiplexer 112 may introduce phase errors or delays which can cause violations of the strict synchrony required to utilize the video stream data. If the delay and the clock frequency are both known ahead of time, it is possible to construct a working design around a system in which the clock multiplexer phase shift is not equal to any multiple of the clock period plus or minus some margin for set-up and hold times of the signals. However, if the clock frequency is not known ahead of time, this condition cannot be met and this solution is not workable.

Therefore an improved system and method are desired for multiplexing synchronous digital video streams.

SUMMARY OF THE INVENTION

The present invention provides various embodiments of a system and method for multiplexing synchronous parallel digital data streams of different clock frequencies into a single data stream while preserving each data stream's timing integrity. Embodiments of the present invention may be used in various applications, such as machine vision systems, image acquisition systems, data acquisition systems, etc.

A plurality of digital data inputs and corresponding clock inputs may be coupled to corresponding FIFOs (First In First Out buffers), which may be further coupled to a data multiplexer (MUX). The data MUX may also be coupled to a data acquisition device, which in one embodiment may be further coupled to a computer. Each clock input may also be coupled to a clock MUX which is further coupled to each FIFO and the data MUX. Finally, a transition state machine may be coupled to the clock MUX, the data MUX, and the FIFOs. In one embodiment, the transition state machine may also be coupled to a computer.

In one embodiment, each digital data input may be operable to receive a synchronous digital data stream from a digital source, such as a digital video camera, while the corresponding clock input concurrently receives the corresponding clock signal. It should be noted that each clock signal may have a different frequency and/or phase.

Each of the plurality of FIFOs may transmit its digital data stream to the data stream multiplexer which may select one of the data streams and transmit the selected data stream to a data acquisition device, such as a frame grabber. Each clock input may transmit its clock signal to the clock MUX which may select one of the MUXed clock signals and transmit the selected clock signal to the data MUX, the FIFOs, and the transition state machine. In one embodiment, a clock multiplexer (or a plurality of clock multiplexers) may be used to receive clock signals from the plurality of clock inputs and to select a single clock signal for transmittal to other components of the system.

In one embodiment, the selected clock signal may be transmitted to at least one FIFO corresponding to at least one data stream. In one embodiment, each FIFO may send a data signal to the data MUX on every selected, or MUXed, clock signal pulse. In one embodiment, the selected clock signal may be sent to the data MUX, as well as to the data acquisition device (frame grabber).

The selected clock signal corresponds to the selected data stream, and so the data from the selected data stream is synchronized with its respective clock signal. The fact that the FIFOs which are not selected may also transmit their data according to the selected clock signal (rather than each FIFO's corresponding clock signal) is not an issue, because the data from the un-selected FIFOs are not used.

The use of FIFOs to decouple the stream output of each camera from the stream input of the data multiplexer combined with the use of the clock multiplexer to select the appropriate clock signal for the selected stream solves the above-mentioned problems of the prior art systems. More specifically, regarding the FIFO underflow/overflow problem of the prior art system described with reference to FIG. 1, by multiplexing the clock signals, selecting the clock signal which corresponds to the selected data stream, and using the selected clock signal to synchronize the output from the selected data stream's FIFO, the data flow rate out of the selected FIFO will match the data flow rate into the FIFO, thus preventing the underflow/overflow problem. Regarding the phase error problem associated with the prior art system described with reference to FIG. 2, the phase error introduced by the clock multiplexer may be made irrelevant by decoupling the stream output of each camera from the stream input of the data multiplexer through the use of the FIFOs, thus allowing the use of the (possibly phase-shifted) selected clock signal to synchronize the output of the selected stream data from the selected FIFO. The synchronized output data stream may then be selected by the data multiplexer and output along with the selected clock signal. In other words, the FIFO functions as a "holding tank" for the selected data stream, and allows the selected data stream to be re-synchronized by the selected clock signal, thus removing the phase shift as an issue.

In one embodiment, each FIFO may also be coupled to a corresponding FIFO control state machine. Each FIFO control state machine may prevent intra-frame transitions to or from its respective FIFO. For example, in the case of a video multiplexing system, the data from each stream may comprise a series of video frames. It may be desirable to prevent transitions between streams (cameras) which give rise to the transmittal of incomplete frames. These transitions may be avoided by restricting transitions to or from a stream to occur between frames, i.e., during a vertical blanking period, or vertical retrace, which may be indicated by an end of frame (EOF) signal. Thus, if a transition is to be made from stream A to stream B, the FIFO control state machine may prevent the transition from FIFO A until the EOF signal for stream A is detected. Then, the FIFO control state machine may prevent reception of stream B data by FIFO B until the EOF signal for stream B is detected. In one embodiment, each FIFO control state machine may flush its corresponding FIFO each time there is a transition from the corresponding stream. In another embodiment, each FIFO control state machine may flush its corresponding FIFO each time there is a transition to the corresponding stream in preparation for reception of new data.

In one embodiment, the transition state machine may be coupled to the data MUX to control the selection of a particular data stream from the MUXed data streams. Similarly, the transition state machine may be coupled to the clock MUX to control the selection of a particular clock signal from the MUXed clock signals. In one embodiment, the transition state machine may receive a selection signal from an external source, such as computer or other external source, and transmit the selection signal to the data MUX and the clock MUX, as well as to the FIFOs.

In one embodiment, the transition state machine may be operable to receive a transition mode signal from the computer or other external source, indicating that intra-frame transitions between streams are to be prevented. The transition mode signal may be transmitted by the transition state machine to the FIFO control state machines to activate this functionality.

In one embodiment, the system may comprise a machine vision or video system where inputs from multiple cameras may be monitored at a central location. The transition state machine may receive periodic selection signals from an automatic scheduler to enable the system to cycle through the cameras on a periodic basis.

In one embodiment, the data MUX may send the selected data stream to the data acquisition device, or frame grabber, where the data may be stored and/or analyzed. Similarly, the clock MUX may transmit the selected clock signal to the data acquisition device to maintain synchrony of the output data stream. In one embodiment, the data acquisition device may be comprised on a circuit card in the computer. In another embodiment, the data acquisition device may be an external device coupled between the computer and the data MUX. In one embodiment, the video stream multiplexing system may be comprised on a circuit board, such as a computer expansion card. In another embodiment, the video stream multiplexing system may be comprised in a chassis, wherein the chassis may further include a power supply which is operable to supply power to the system at the appropriate voltages.

BRIEF DESCRIPTION OF THE DRAWINGS

A better understanding of the present invention can be obtained when the following detailed description of the preferred embodiment is considered in conjunction with the following drawings, in which.

Figure 1:
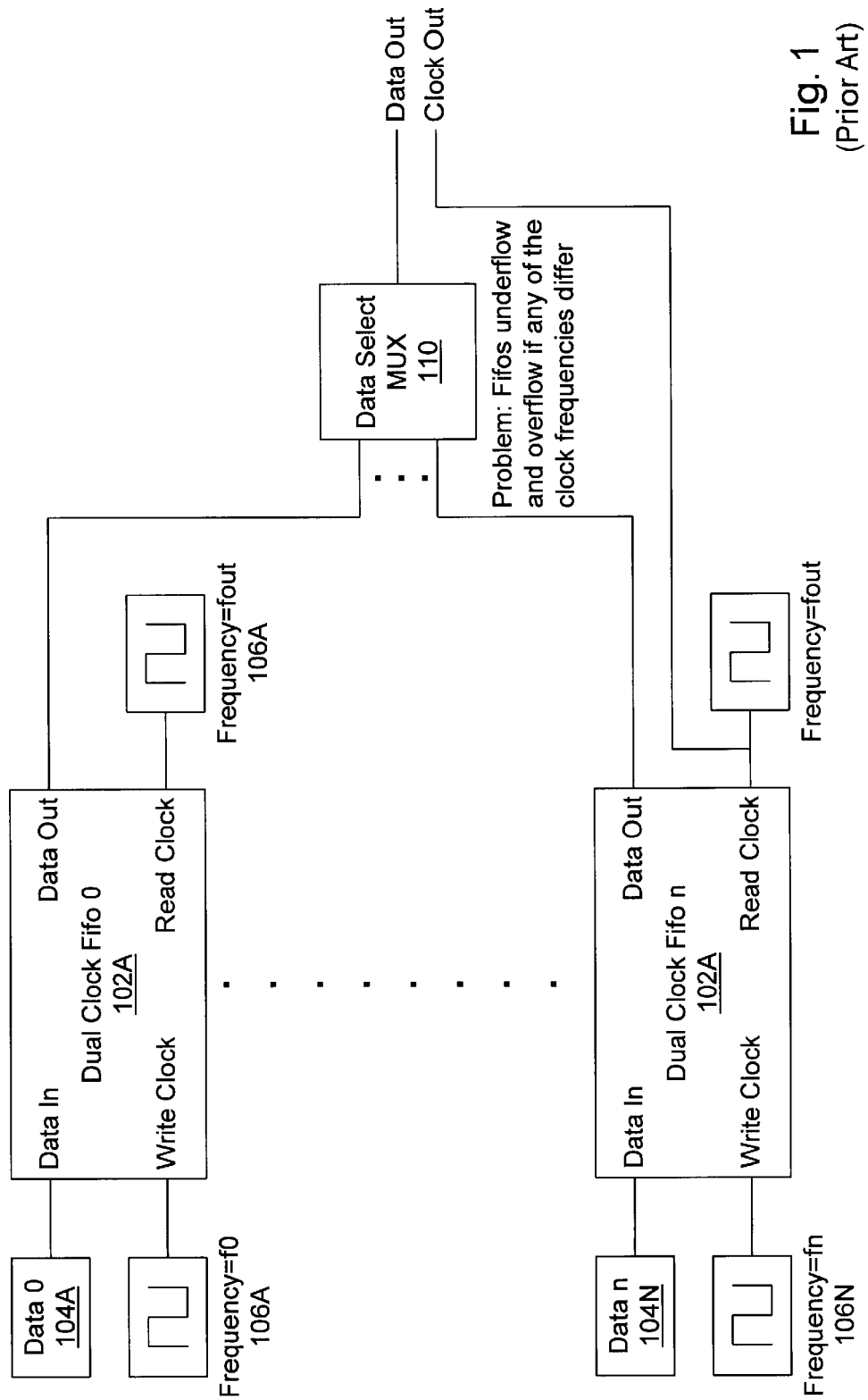
FIG. 1 illustrates a first prior art FIFO decoupling implementation.

While the invention is susceptible to various modifications and alternative forms, specific embodiments thereof are shown by way of example in the drawings and will be described in detail herein. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
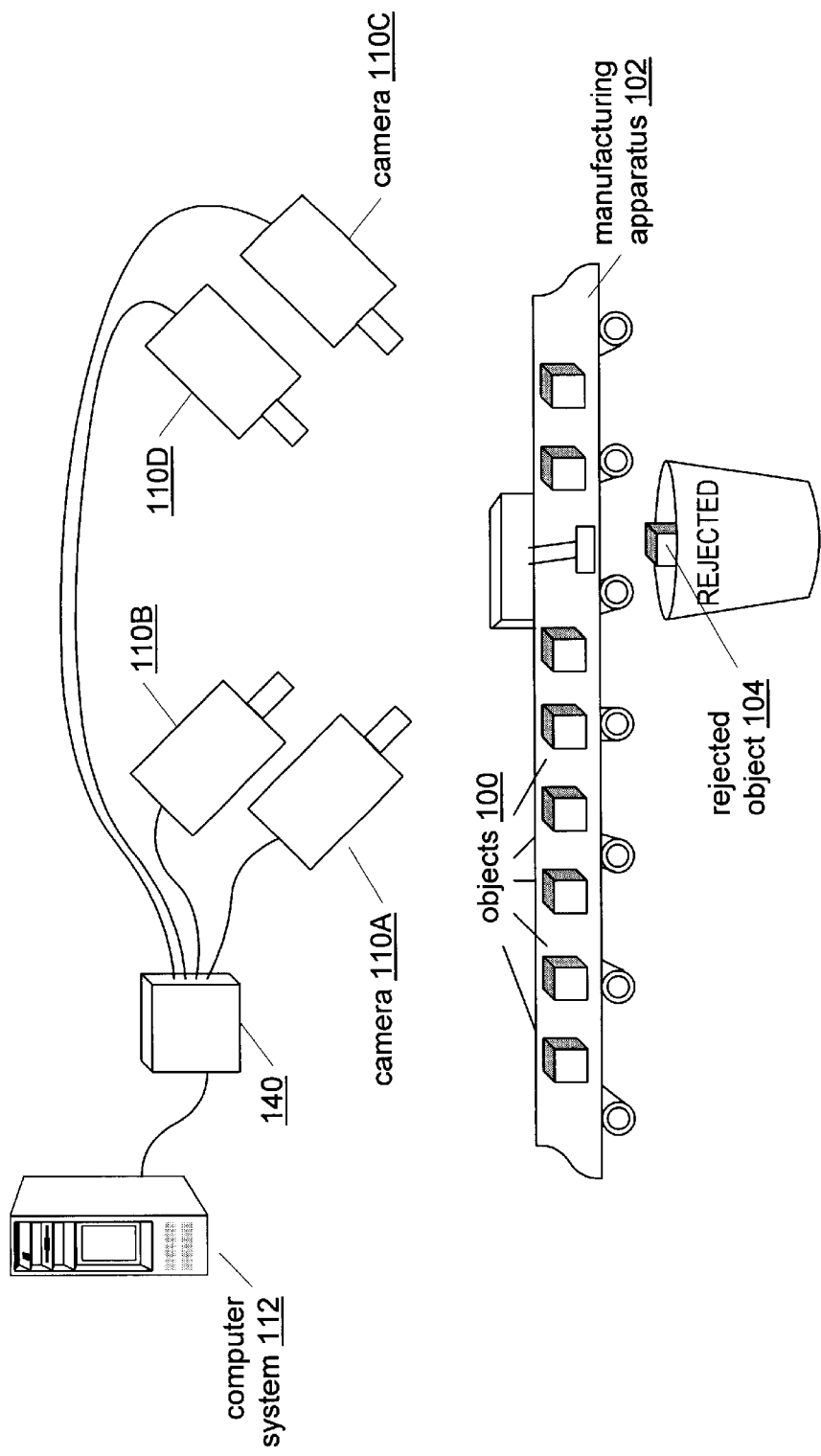
FIG. 3 is a block diagram illustrating one embodiment of a machine vision system for inspecting manufactured objects according to one embodiment of the invention.

FIG. 3—Machine Vision System

FIG. 3 is a block diagram illustrating one embodiment of a machine vision system (also referred to as an image acquisition and analysis system) for inspecting manufactured objects. Embodiments of the present invention may be used in various applications, such as machine vision systems, image acquisition systems, data acquisition systems, etc. The following describes one embodiment of the present invention used in the machine vision system of FIG. 3.

The system of FIG. 3 illustrates a plurality of objects 100 which move along a manufacturing apparatus 102. The system includes a plurality of cameras 110 operable to acquire images of the objects 100. In this example, four cameras (110A, 110B, 110C and 110D) are shown, but in other embodiments any number of cameras may be used. The cameras 110 may comprise any type of cameras or devices operable to acquire images of the objects 100. Each of the cameras 110 is operable to output a respective video stream and a corresponding clock signal, wherein the respective video stream is synchronous with the corresponding clock signal.

Two or more of the cameras 110 may operate to provide video data streams synchronized to different respective clock signals. For example, each of the plurality of cameras 110 may operate to provide video data streams synchronized to different respective clock signals. The different respective clock signals may have different frequencies and/or different phase relationships. Thus, a first camera 110A may provide a first video data stream synchronized to a first clock signal having a first frequency, and a second camera 110A may provide a second video data stream synchronized to a second different clock signal having a second different frequency. The first and second clock signals may have different frequencies and be out of phase with each other. Likewise, each of the plurality of cameras 110 may generate respective video streams based on different respective clock signals, each having a different frequency and/or different phase relationship.

As shown in FIG. 3, each of the plurality of cameras 110 is coupled to a video stream multiplexing system 140 according to one embodiment of the present invention. The video stream multiplexing system 140 is operable to select one of the video streams from one of the plurality of cameras 110 and output the selected video stream to computer system 112, e.g., to an image acquisition (IMAQ) device comprised in the computer system 112. The computer system 112 may then analyze the images captured by the image acquisition board. Alternatively, the image acquisition board may include an on-board processor and memory for performing a portion or all of the image analysis.

As described further below, the video stream multiplexing system 140 is operable to multiplex or select one of the video streams and a corresponding clock signal and transmit the video stream data in a synchronous manner (using the clock signal) to a user of the system. In one embodiment, the system may be implemented as an external device to which the IMAQ card is coupled. In an alternate embodiment, the system may be implemented on the IMAQ card. In yet another embodiment, the system may be implemented on an expansion card comprised on the computer system.

As described below with reference to FIG. 4, the computer system 112 may be a computer system of any type, such as a standard personal computer system. In general, the term "computer system" can be broadly defined to encompass any device having at least one processor which executes instructions from a memory medium. The computer system 112 may take various forms, including a personal computer system, PXI or VXI card, mainframe computer system, workstation, network appliance, or other device. In one embodiment, each computer system 112 comprises a controller or card (a "computer on a card") housed in a PXI or VXI chassis. The chassis may further include one or more image acquisition boards as well as one or more video stream multiplexing systems 140. Each of the video stream multiplexing systems 140 would then couple to the one or more cameras.

The computer system 112 may use or store image processing software according to one embodiment of the present invention. The computer system 112 preferably includes a memory medium on which software operable to receive and analyze the object images is stored.

In the machine vision application shown in FIG. 3, the images received from the cameras 110 may be analyzed using the image processing software executing on the computer system 112. The analyses of the images may be used to detect defects or other characteristics of the objects 100. For example, in various applications the analyses may be designed to detect one or more of: physical surface defects (scratches, etc.); one or more components located correctly on the object; a correct label on the object; a correct marking on the object; correct color information on the object, etc.

In a machine vision manufacturing application, the results of the image analyses may be used to determine whether an object meets desired production standards. In one embodiment, the results from each camera 110 may be considered together in making this determination. This determination may be performed in any of various ways, as desired for a particular application. If the object does not meet the desired production standards, the object may be rejected. For example, in rejecting the object, the object may be removed from an assembly line as indicated in FIG. 3 by the rejected object 104, or the system may store information indicating that the object failed the inspection. Also, images of the rejected object may be stored if desired.

Figure 4:
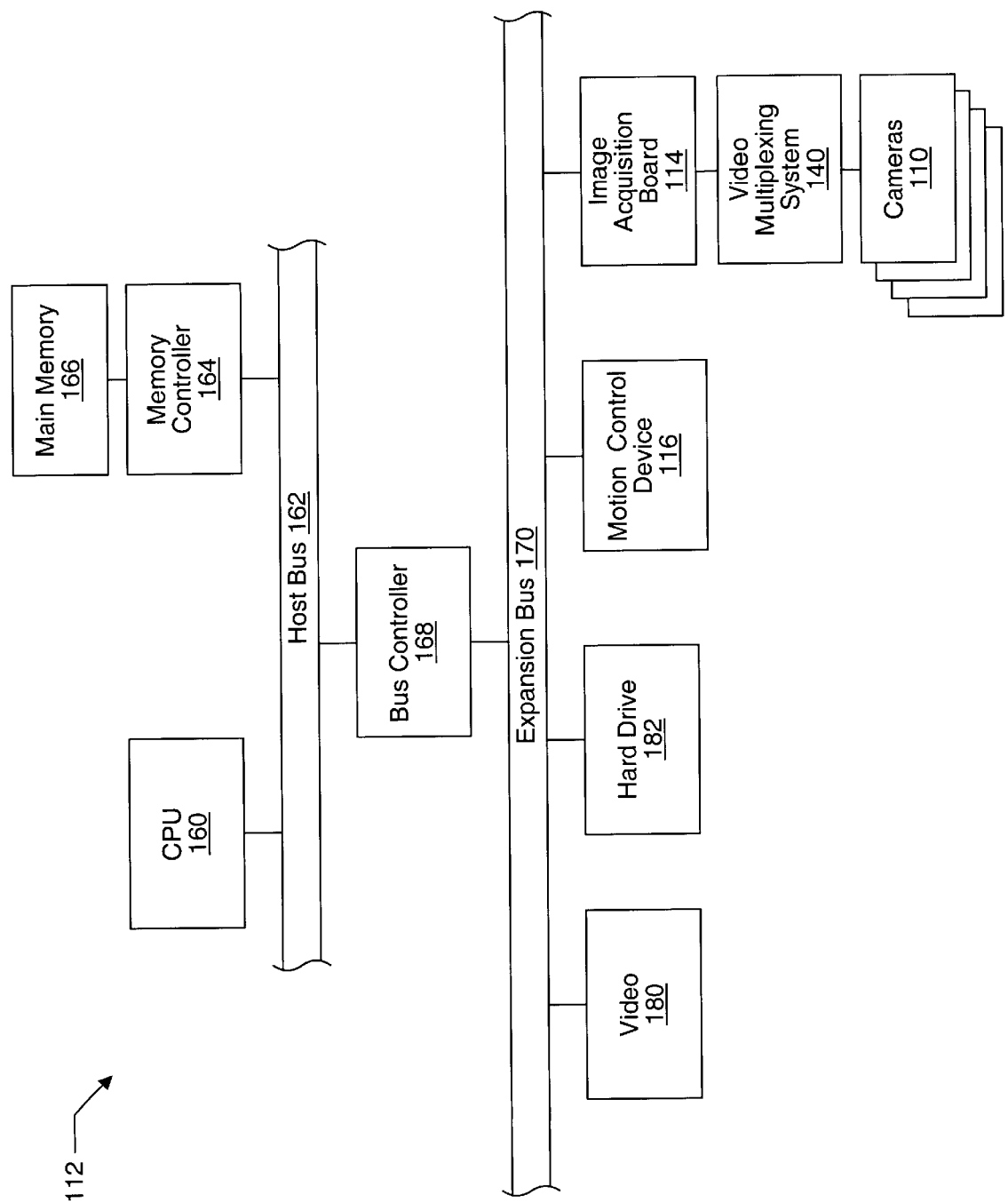
FIG. 4 is an exemplary block diagram illustrating one embodiment of the computer system illustrated in FIG. 3.

FIG. 4—Computer System Block Diagram

FIG. 4 is an exemplary block diagram illustrating one embodiment of the computer system 112 illustrated in FIG. 3. It is noted that any type of computer system configuration or architecture can be used as desired, and FIG. 4 illustrates a representative PC embodiment. A computer system 112 may be a general purpose computer system. As noted above, a computer system 112 may also be a computer implemented on a PXI card installed in a PXI chassis. A computer system 112 may also be a computer implemented on a VXI card installed in a VXI chassis, or other type of computer system. The elements of a computer not necessary to understand the present invention have been omitted from FIG. 4 for simplicity.

The computer 112 includes at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 may store image processing software according to one embodiment of the present invention. The main memory 166 may also store operating system software as well as the software for operation of the computer system, as is well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 may include slots for various devices such as an image acquisition device or card 114, a motion control card 116, and possibly other devices. The computer 102 may further comprise a video display subsystem 180 and hard drive 182 coupled to the expansion bus 170.

As shown, the image acquisition device 114 couples to the video stream multiplexing system 140. The video stream multiplexing system 140 in turn couples to the plurality of cameras 110.

Figure 5:
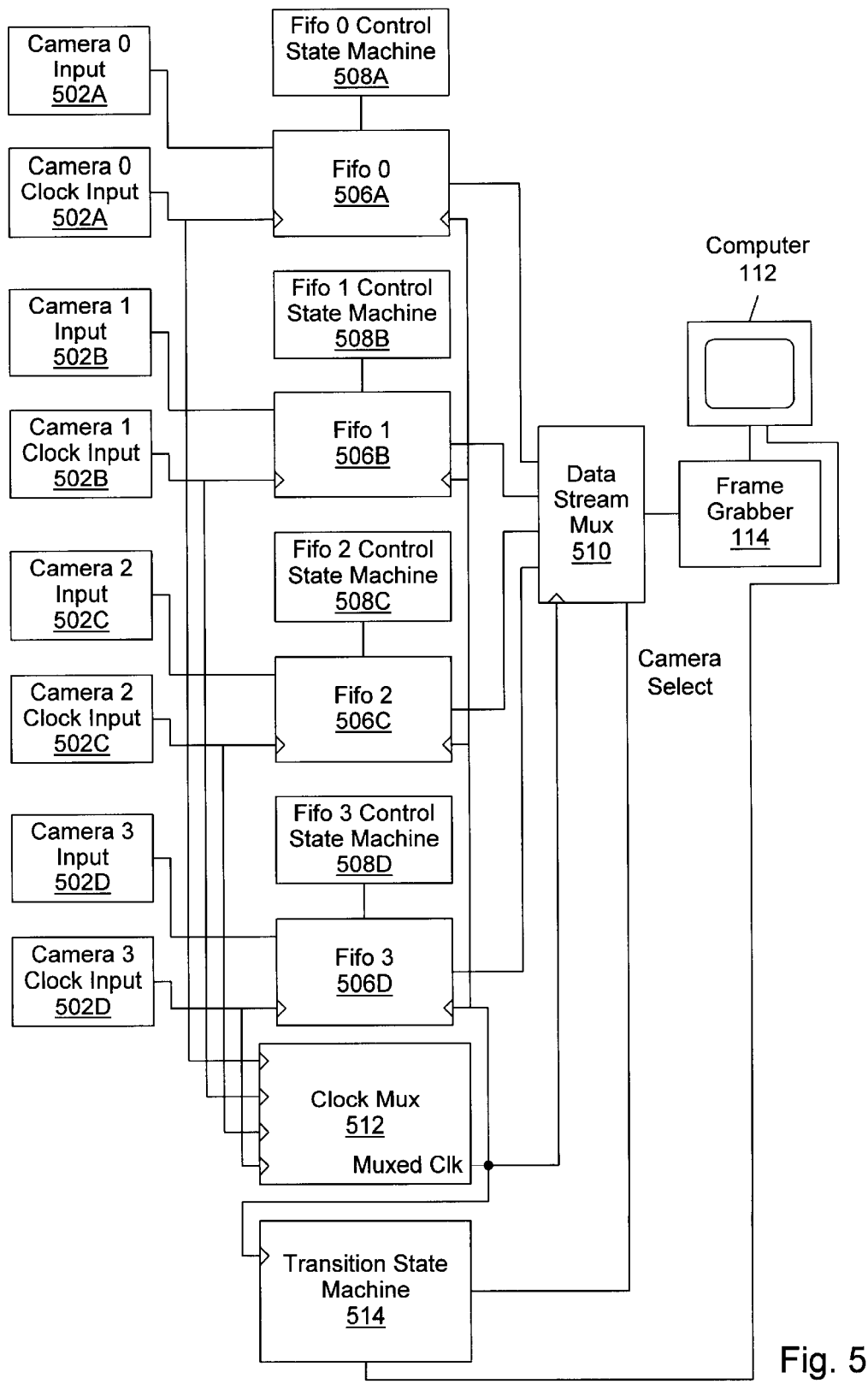
FIG. 5 is a block diagram of a synchronous digital data stream multiplexing system, according to one embodiment.

FIG. 5: A Block Diagram Of A Synchronous Digital Data Stream Multiplexing System The present invention provides various embodiments of a system for multiplexing synchronous parallel digital data streams of different clock frequencies into a single data stream while preserving each data stream's timing integrity.

FIG. 5 is a block diagram of one embodiment of the synchronous digital data stream multiplexing system. For illustration purposes, the system shown is a digital video stream multiplexing system, although this is not meant to limit the invention to video systems, as the system may be used to multiplex any synchronous digital data streams. As FIG. 5 shows, digital data inputs 502 and corresponding clock inputs 504 may be coupled to corresponding FIFOs 506, which may be further coupled to a data multiplexer (MUX) 510. In one embodiment, the data MUX 510 may also be coupled to a data acquisition device 114, which may be further coupled to computer 112. Each clock input 504 may also be coupled to a clock MUX 512 which is further coupled to each FIFO 506 and the data MUX 510. In one embodiment, each FIFO 506 may be coupled to a corresponding FIFO control state machine 508, described below. Finally, a transition state machine 514 may be coupled to the clock MUX 512, the data MUX 510, and the FIFOs 506. In one embodiment, the transition state machine 514 may also be coupled to computer 112. Details of the operation of various embodiments of this system are described below.

Acquiring Data Streams

In one embodiment, the invention may provide a plurality of ports for receiving incoming streams. In another embodiment, the invention may provide just one port. In one embodiment, each port may be used to acquire just one stream. In another embodiment, multiple streams may be transmitted through the same port and separated, filtered, tuned, extracted, uncompressed, reconstructed, or otherwise differentiated from each other into separate streams.

In one embodiment, at least one connection may be through a serial, parallel, USB, SCSI, IDE, RGB, NTSC, PAL, SECAM, or other similar port which may be used for receiving incoming streams. In another embodiment, at least one Internet, intranet, or other network port may be used for receiving incoming streams. In another embodiment, the invention may provide at least one coaxial port or similar port for receiving incoming streams. In another embodiment, the invention may use at least one infrared port for receiving incoming streams. In another embodiment, the invention may use at least one radio, microwave, or other wireless port for receiving incoming streams. In another embodiment, different types of ports for receiving incoming streams may be used, including wireless, with wire, and other similar means of receiving incoming streams.

In one embodiment, each port may comprise a data input and a clock input. In another embodiment, both data and clock signals may be transmitted over the same port and the information differentiated later, for example based on frequency, phase, protocol, or format, and recreated after decompression, or some other similar means. In another embodiment, the data input or clock input may comprise a plurality of wires, connections, bands, or other means of input. In one embodiment, the data port may consist of multiple pins each carrying data such as data regarding color, intensity, and other data relevant to video transmission.

Collecting Data Streams

As FIG. 5 shows, in one embodiment, a plurality of digital data inputs 502A–D with corresponding clock inputs 504A–D may be coupled to respective FIFOs 506A–D. Each digital data input 502 may be operable to receive a synchronous digital data stream from a digital source, such as a digital camera, while the corresponding clock input 504 concurrently receives a corresponding clock signal. It should be noted that each clock signal may comprise a different frequency.

In one embodiment, a FIFO 506 may store data signals on every clock signal pulse. In one embodiment, a FIFO 506 may store data signals on every rising edge of the clock signal pulses. In another embodiment, a FIFO 506 may store data signals on every falling edge of the clock signal pulses.

Selecting the Output Stream

Each of the plurality of FIFOs 506 may be operable to couple to data stream multiplexer (MUX) 510, and to transmit the digital data stream to the data stream multiplexer 510 which may be operable to select one of the data streams and transmit the selected data stream to data acquisition device 114, described in more detail below.

Multiplexing Clock Signals

In one embodiment, each clock input 504 may be coupled to the clock multiplexer 512. Each clock signal may be transmitted to the clock MUX 512 which may be operable to select one of the MUXed clock signals and transmit the selected clock signal to the data MUX 510, the FIFOs 506, and the transition state machine 514. In one embodiment, a plurality of clock multiplexers 512 may be used to receive clock signals from the plurality of clock inputs 504 and to select the single selected clock signal for transmittal to other components of the system.

In one embodiment, the selected clock signal may be transmitted to at least one FIFO 506. In one embodiment, the selected clock signal may be sent to at least one data stream multiplexer, or data MUX, then to the data acquisition device, such as frame grabber 114. In one embodiment, each FIFO 506 may send a data signal on every pulse of the selected, or MUXed, clock signal. In one embodiment, a FIFO 506 may send a data signal on every rising edge of the selected clock signal. In another embodiment, a FIFO may send a data signal on every falling edge of the selected clock signal.

The selected clock signal corresponds to the selected data stream, and so the data from the selected data stream is synchronized with its respective clock signal. The fact that the FIFOs which are not selected are also transmitting their data according to the selected clock signal (rather than each FIFO's corresponding clock signal) is not an issue, because the data from the un-selected FIFOs are not used.

Figure 2:
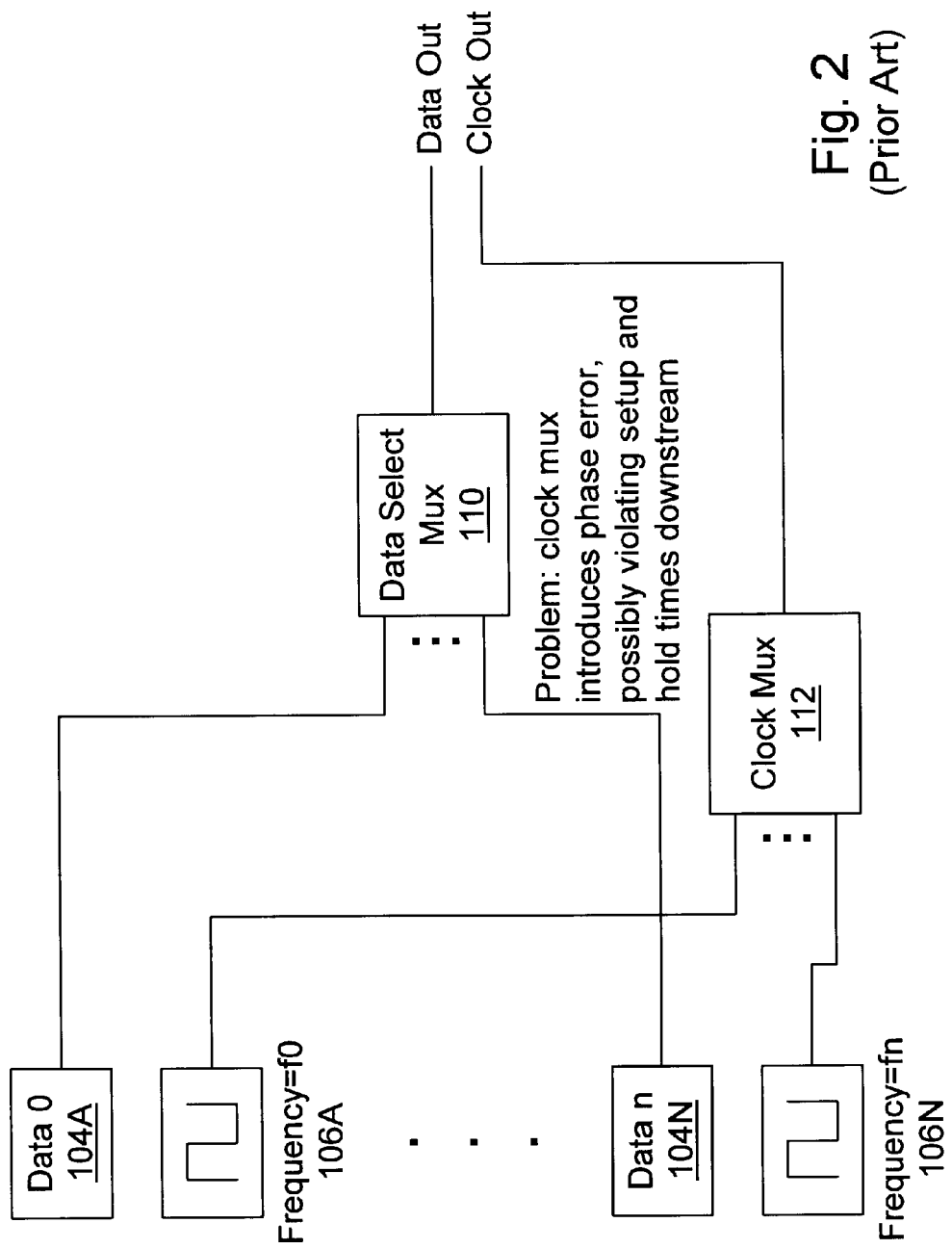
FIG. 2 illustrates a second prior art multiplexed clock implementation.

The use of FIFOs 506 to decouple the stream output of each camera from the stream input of the data multiplexer 510 combined with the use of the clock multiplexer 512 to select the appropriate clock signal for the selected stream solves the above-mentioned problems of the prior art systems. More specifically, regarding the FIFO underflow/overflow problem of the prior art system described with reference to FIG. 1, by multiplexing the clock signals, selecting the clock signal which corresponds to the selected data stream, and using the selected clock signal to synchronize the output from the selected data stream's FIFO 506, the data flow rate out of the selected FIFO will match the data flow rate into the FIFO, thus preventing the underflow/overflow problem. Regarding the phase error problem associated with the prior art system described with reference to FIG. 2, the phase error introduced by the clock multiplexer 512 is made irrelevant by decoupling the stream output of each camera from the stream input of the data multiplexer 510, thus allowing the use of the (possibly phase-shifted) selected clock signal to synchronize the output of the selected stream data from the selected FIFO. The synchronized output data stream may then be selected by the data multiplexer and output along with the selected clock signal. In other words, the FIFO functions as a "holding tank" for the selected data stream, and allows the selected data stream to be re-synchronized by the selected clock signal, thus removing the phase shift as an issue.

Transition Coordination

In one embodiment, each FIFO 506 may be coupled to corresponding FIFO control state machine 508. Each FIFO control state machine 508 may be operable to prevent intra-frame transitions to or from its respective FIFO. For example, in the case of a video multiplexing system, the data from each stream may comprise a series of video frames. It may be desirable to prevent transitions between streams (cameras) which give rise to the transmittal of incomplete frames. These transitions may be avoided by restricting transitions to or from a stream to occur between frames, i.e., during a vertical blanking period, or vertical retrace, which may be indicated by an end of frame (EOF) signal. Thus, if a transition is to be made from stream A to stream B, the FIFO control state machine 508A may prevent the transition from FIFO 506A until the EOF signal for stream A is detected. Then, the FIFO control state machine 508B may prevent reception of stream B data by FIFO 506B until the EOF signal for stream B is detected. It should be noted that the term "frame" may refer not only to a video frame, but to any demarcated data set as well. Thus, the term "data frame" may refer to a video frame of a video stream, or to a generic data set of a digital data stream.

In one embodiment, all FIFOs 506 may be coupled to a single FIFO control state machine. In another embodiment, there may be more FIFOs than FIFO control state machines. In one embodiment, each FIFO control state machine 508 may flush its corresponding FIFO each time there is a transition from the corresponding stream. In another embodiment, each FIFO control state machine 508 may flush its corresponding FIFO each time there is a transition to the corresponding stream in preparation for reception of new data.

In one embodiment, transition state machine 514 may be coupled to the data MUX 510 to control the selection of a particular data stream from the MUXed data streams. Similarly, the transition state machine 514 may be coupled to the clock MUX 512 to control the selection of a particular clock signal from the MUXed clock signals. In one embodiment, the transition state machine 514 may receive a selection signal from an external source, such as computer 112, or some other external source, and transmit the selection signal to the data MUX 510 and the clock MUX 512, as well as the FIFOs 506.

In one embodiment, the transition state machine 514 may be operable to receive a transition mode signal from the computer 112 or other external source, indicating that intra-frame transitions between streams are to be prevented. The transition mode signal may be transmitted by the transition state machine 514 to the FIFO control state machines 508 to activate this functionality.

In one embodiment, the system may comprise a security video system where inputs from multiple cameras may be monitored at a central location. The transition state machine 514 may receive periodic selection signals from an automatic scheduler to enable to system to cycle through the cameras on a periodic basis.

Generating Output Stream

In one embodiment, the data MUX 510 may send the selected data stream to the data acquisition device 114, or frame grabber, where the data may be stored and/or analyzed. Similarly, the clock MUX 512 may transmit the selected clock signal to the data acquisition device 114 to maintain synchrony of the data stream. In one embodiment, the data acquisition device 114 may be comprised on a circuit card in the computer 112. In another embodiment, the data acquisition device 114 may be an external device coupled between the computer 112 and the data MUX 510. In an embodiment where the data streams comprise video data streams, the data acquisition device 114 may comprise an image acquisition device which is operable to store a video frame in response to the selected video data stream. In one embodiment, the data acquisition device 114 may be operable to analyze the received video data.

In one embodiment, the system described above may be comprised on a circuit board, such as a computer expansion card. In another embodiment, the system may be comprised in a chassis, wherein the chassis may further include a power supply which is operable to supply power to the system at the appropriate voltages.

Figure 6:
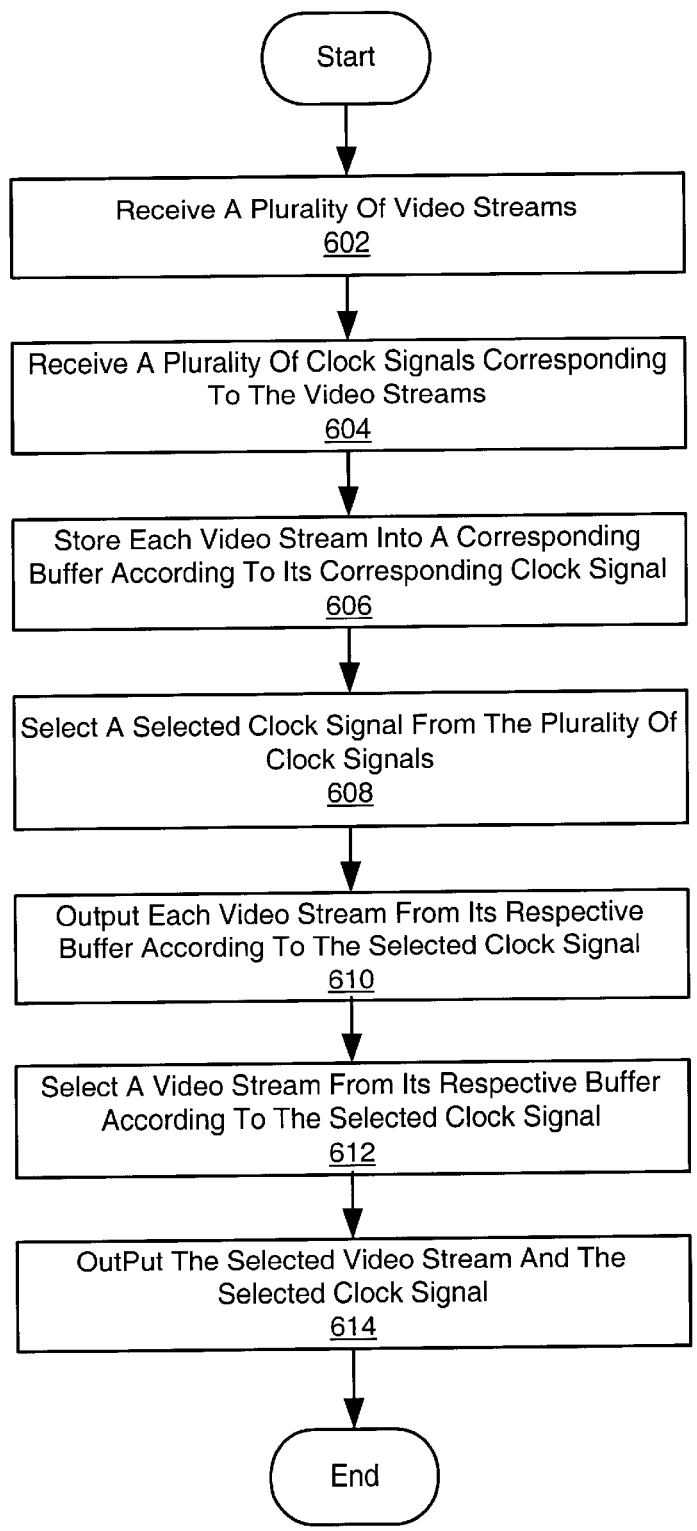
FIG. 6 is a flow chart of a video stream multiplexing process, according to one embodiment.

FIG. 6: Flowchart of a Video Stream Multiplexing Process

FIG. 6 is a flowchart of one embodiment of a video stream multiplexing process. As FIG. 6 shows, in 602, a plurality of video streams may be received, such as from multiple digital video cameras. A plurality of clock signals may also be received, as indicated in 604, wherein each clock signal is associated with one of the video streams, i.e., each video stream is synchronous with a corresponding clock signal.

Then, in 606, each of the plurality of video streams may be stored in a corresponding buffer according to its corresponding clock signal. In one embodiment, each buffer may comprise a FIFO (First In First Out buffer) which is operable to receive and store a data signal for each pulse of the corresponding clock signal. Thus, each FIFO's input operation may be synchronous with the corresponding clock.

As indicated in 608, a selected clock signal may be selected from the plurality of clock signals. In one embodiment, the selected clock signal may be selected by a clock multiplexer (MUX) which receives the plurality of clock signals and outputs the selected clock signal. In one embodiment, the clock signal may be selected by the clock MUX in response to a selection signal transmitted from a control source, such as a computer or automatic scheduler.

In 610, each of the plurality of video streams may be output from each of the corresponding buffers according to the selected clock signal. In other words, data from each video stream is output from its respective buffer based upon the selected clock signal, instead of the respective clock signals of the video streams. In the cases where a video stream clock signal frequency differs from the selected clock signal frequency, the synchrony of the data may be violated. However, as mentioned above, this is not an issue because only the video stream data from the selected video stream (which corresponds to the selected clock signal) is utilized. In one embodiment, the selection process may optionally include receiving a transition mode signal from the control source, and preventing intra-frame transitions to or from each video stream in accordance with the transition mode signal, such that transitions from or to a video stream may only be made during the vertical blanking period, i.e., between frames. In one embodiment, each buffer may be cleared before said storing of video stream data. In another embodiment, each buffer may be prevented from outputting stored video stream data until the buffer has received an initial first amount of the video stream data, thus preventing buffer underflows from occurring.

Then, in 612, one of the video streams output from one of the plurality of buffers may be selected in accordance with the selected clock signal. In one embodiment, the selected video stream may be selected by a video stream multiplexer (MUX) which receives the plurality of video streams and outputs the selected video stream. It should be noted that in the preferred embodiment, the selected video stream corresponds to the selected clock signal. In other words, both the selected video stream and the selected clock signal originate from the same camera. In one embodiment, the video stream may be selected by the video stream MUX in response to the selection signal transmitted from the control source mentioned above, such as a computer or automatic scheduler.

Finally, in 614, the selected video stream and the selected clock signal may both be output as a synchronized data stream. In one embodiment, the selected video stream and the selected clock signal may be output to an image acquisition device for storage and/or analysis.

It should be noted that the above process has been described with respect to digital video data for illustration purposes only, and that the process may also be applied to other digital data streams, as well. For example, as mentioned above, the term "frame" may refer not only to a digital video frame, but to any demarcated data set comprised in a digital data stream.

Thus, various embodiments of the system and method described above may allow multiple synchronous digital data streams, such as video streams, to be multiplexed together while preserving each stream's corresponding clock signal, such that a desired stream may be selected by a user and output with its corresponding clock signal to a data acquisition device, such as an image acquisition device.

What is claimed:

1. A video stream multiplexing system, comprising:
    a plurality of video stream inputs each for receiving a video stream;
    a plurality of clock inputs for receiving a plurality of clock signals, wherein each clock signal is associated with one of said video streams,
    wherein each video stream is synchronous with a corresponding one of said plurality of clock signals;
    at least one clock multiplexer coupled to the plurality of clock inputs and configured to receive the plurality of clock signals and output a selected clock signal selected from the plurality of clock signals;
    a plurality of FIFOs coupled to the plurality of video stream inputs and the at least one clock multiplexer, wherein each FIFO is configured to receive one video stream and its corresponding clock signal, and wherein each FIFO is configured to transmit the one video stream according to the selected clock signal;
    a video stream multiplexer coupled to each of the plurality of FIFOs and the at least one clock multiplexer, wherein the video stream multiplexer is operable to select one of the video streams output from one of the plurality of FIFOs according to the selected clock signal and output the selected video stream.

2. The video stream multiplexing system of claim 1, further comprising:
    an image acquisition device configured to receive the selected video stream from the video stream multiplexer and the selected clock signal from the at least one clock multiplexer, wherein the image acquisition device stores a video frame in response to the selected video stream.

3. The video stream multiplexing system of claim 1, further comprising a transition state machine coupled to the video stream multiplexer and the clock multiplexer;
    wherein the transition state machine is operable to receive a selection signal from a control source, and transmit the selection signal to the video stream multiplexer and the clock multiplexer;
    wherein the video stream multiplexer is operable to select one of the video streams in response to receiving the selection signal transmitted by the transition state machine; and
    wherein the transition state machine is further coupled to the at least one clock multiplexer, and wherein the clock multiplexer is operable to select one of the clock signals in response to receiving the selection signal transmitted by the transition state machine.

4. The video stream multiplexing system of claim 3,
    wherein the transition state machine is further coupled to each of the plurality of FIFOs, wherein the transition state machine is further operable to receive a transition mode signal from the control source, and transmit the transition mode signal to each of the plurality of FIFOs;
    wherein each FIFO includes FIFO control state machine logic which is operable to prevent intra-frame transitions to or from each video stream in response to receiving the transition mode signal.

5. The video stream multiplexing system of claim 3, further comprising a computer system, wherein the image acquisition device is comprised in the computer system.

6. The video stream multiplexing system of claim 1, wherein each FIFO includes FIFO control state machine logic which is operable to prevent intra-frame transitions to or from each video stream.

7. The video stream multiplexing system of claim 1, wherein each FIFO includes FIFO control state machine logic which is operable to clear the FIFO before the FIFO begins receiving video stream data, and to prevent output of the video stream data from the FIFO until the FIFO has received an initial first amount of the video stream data.

8. The video stream multiplexing system of claim 1, wherein each of the plurality of video stream inputs is operable to receive a video stream from a corresponding digital camera.

9. The video stream multiplexing system of claim 1, wherein the system is comprised on a circuit board.

10. The video stream multiplexing system of claim 1, wherein the system is comprised in a chassis, wherein the chassis comprises a power supply, and wherein the power supply is operable to supply power to the system.

11. A data stream multiplexing system, comprising:
    a plurality of data stream inputs each for receiving a data stream;
    a plurality of clock inputs for receiving a plurality of clock signals, wherein each clock signal is associated with one of said data streams,
    wherein each data stream is synchronous with a corresponding one of said plurality of clock signals;
    at least one clock multiplexer coupled to the plurality of clock inputs and configured to receive the plurality of clock signals and output a selected clock signal selected from the plurality of clock signals;
    a plurality of FIFOs coupled to the plurality of data stream inputs and the at least one clock multiplexer, wherein each FIFO is configured to receive one data stream and its corresponding clock signal, and wherein each FIFO is configured to transmit the one data stream according to the selected clock signal;
    a data stream multiplexer coupled to each of the plurality of FIFOs and the at least one clock multiplexer, wherein the data stream multiplexer is operable to select one of the data streams output from one of the plurality of FIFOs according to the selected clock signal and output the selected data stream.

12. The data stream multiplexing system of claim 1, further comprising:
    an data acquisition device configured to receive the selected data stream from the data stream multiplexer and the selected clock signal from the at least one clock multiplexer, wherein the data acquisition device stores a data frame in response to the selected data stream.

13. The data stream multiplexing system of claim 12, wherein the data stream is a video data stream, and wherein the data acquisition device is an image acquisition device; and wherein each of the plurality of data stream inputs is operable to receive a video data stream from a corresponding digital camera.

14. The data stream multiplexing system of claim 1, further comprising a transition state machine coupled to the data stream multiplexer and the clock multiplexer;

wherein the transition state machine is operable to receive a selection signal from a control source, and transmit the selection signal to the data stream multiplexer and the clock multiplexer;

wherein the data stream multiplexer is operable to select one of the data streams in response to receiving the selection signal transmitted by the transition state machine; and wherein the transition state machine is further coupled to the at least one clock multiplexer, and wherein the clock multiplexer is operable to select one of the clock signals in response to receiving the selection signal transmitted by the transition state machine.

15. The data stream multiplexing system of claim 14, wherein the transition state machine is further coupled to each of the plurality of FIFOs, wherein the transition state machine is further operable to receive a transition mode signal from the control source, and transmit the transition mode signal to each of the plurality of FIFOs;

wherein each FIFO includes FIFO control state machine logic which is operable to prevent intra-frame transitions to or from each data stream in response to receiving the transition mode signal.

16. The data stream multiplexing system of claim 3, further comprising a computer system, wherein the data acquisition device is comprised in the computer system.

17. The data stream multiplexing system of claim 1, wherein each FIFO includes FIFO control state machine logic which is operable to prevent intra-frame transitions to or from each data stream.

18. The data stream multiplexing system of claim 1, wherein each FIFO includes FIFO control state machine logic which is operable to clear the FIFO before the FIFO begins receiving data stream data, and to prevent output of the data stream data from the FIFO until the FIFO has received an initial first amount of the data stream data.

19. The data stream multiplexing system of claim 1, wherein the system is comprised on a circuit board.

20. The data stream multiplexing system of claim 1, wherein the system is comprised in a chassis, wherein the chassis comprises a power supply, and wherein the power supply is operable to supply power to the system.

21. A method for multiplexing video streams, comprising:

receiving a plurality of video streams;

receiving a plurality of clock signals, wherein each clock signal is associated with one of said video streams, wherein each video stream is synchronous with a corresponding one of said plurality of clock signals;

storing each of the plurality of video streams in a corresponding buffer according to its corresponding clock signal selecting a selected clock signal from the plurality of clock signals;

outputting each of the plurality of video streams from each of the corresponding buffers according to the selected clock signal;

selecting one of the video streams output from one of the plurality of buffers according to the selected clock signal; and outputting the selected video stream and the selected clock signal.

22. The method of claim 21, wherein outputting the selected video stream and the selected clock signal comprises outputting the selected video stream and the selected clock signal to an image acquisition device for one or more of storage or analysis.

23. The method of claim 21, further comprising:

receiving a selection signal from a control source, and selecting the selected video stream and the selected clock signal in accordance with the selection signal.

24. The method of claim 23, further comprising:

receiving a transition mode signal from the control source, and preventing intra-frame transitions to or from each video stream in accordance with the transition mode signal.

25. The method of claim 23, further comprising:

clearing each buffer before said storing; and preventing output from each buffer until the buffer has received an initial first amount of the video stream data.

26. The method of claim 21, wherein each video stream and clock signal originate from a corresponding digital camera.

* * * * *